US011097908B2

(12) United States Patent
Tanaka

(10) Patent No.: US 11,097,908 B2
(45) Date of Patent: Aug. 24, 2021

(54) LINEAR CONVEYOR

(71) Applicant: KYOTO SEISAKUSHO CO.,LTD., Kyoto (JP)

(72) Inventor: Atsushi Tanaka, Kyoto (JP)

(73) Assignee: KYOTO SEISAKUSHO CO., LTD., Kyoto (JP)

( * ) Notice: Subject to any disclaimer, the term of this patent is extended or adjusted under 35 U.S.C. 154(b) by 0 days.

(21) Appl. No.: 16/770,259

(22) PCT Filed: Dec. 5, 2018

(86) PCT No.: PCT/JP2018/044772
§ 371 (c)(1),
(2) Date: Jun. 5, 2020

(87) PCT Pub. No.: WO2019/111963
PCT Pub. Date: Jun. 13, 2019

(65) Prior Publication Data
US 2020/0385221 A1 Dec. 10, 2020

(30) Foreign Application Priority Data
Dec. 6, 2017 (JP) .............................. JP2017-233985

(51) Int. Cl.
*B65G 54/02* (2006.01)
*B65G 21/20* (2006.01)
(Continued)

(52) U.S. Cl.
CPC .......... *B65G 54/02* (2013.01); *B65G 21/2054* (2013.01); *B65G 43/10* (2013.01); *H02K 41/031* (2013.01); *B65G 2203/0283* (2013.01)

(58) Field of Classification Search
CPC ........ B65G 54/02; B65G 43/08; B65G 43/10; B65G 35/06; B65G 23/23; B65G 47/22;
(Continued)

(56) References Cited

U.S. PATENT DOCUMENTS 4,733,517 A * 3/1988 Araki .................... B29C 66/843
141/126
4,742,778 A * 5/1988 Morishita ............... E01B 25/28
104/284
(Continued)

FOREIGN PATENT DOCUMENTS

JP   2006264737 A   10/2006
JP      6155406 B1    6/2017
JP   2018172141 A   11/2018

OTHER PUBLICATIONS

International Search Report for PCT/JP2018/044772 dated Feb. 26, 2019.
(Continued)

*Primary Examiner* — Joseph A Dillon, Jr.
(74) *Attorney, Agent, or Firm* — Millen, White, Zelano & Branigan, P.C.; William Nixon

(57) ABSTRACT

A linear conveyor to transport an article includes a base platform provided with a stator, movers configuring the linear motor and holding members for holding an article provided on the movers. The holding member is arranged at a position which is radially outwardly apart from the traveling track of the mover by a predetermined distance. When the movers travel on a curved traveling track served by the stator, the controller controls the interval of the adjacently arranged movers to narrower than the interval when the movers travel on an immediately preceding linear traveling track, and so that when the movers travel on a linear traveling track on the stator, the interval between the adjacently arranged movers is wider than the interval when the movers travel on the immediately preceding curved traveling track, thereby setting the interval between the holding members of the adjacently arranged movers to be constant.

6 Claims, 8 Drawing Sheets

(51) Int. Cl.
*B65G 43/10* (2006.01)
*H02K 41/03* (2006.01)

(58) Field of Classification Search
CPC ............... B65G 2201/02; B65G 21/20; B65G 21/2054; B65G 2203/0283; H01L 21/67709; G01N 2035/0477; H02K 41/033
USPC ........................ 198/465.2, 464.4, 619, 805
See application file for complete search history.

(56) References Cited

U.S. PATENT DOCUMENTS

| | | | | |
|---|---|---|---|---|
| 4,915,209 | A | * | 4/1990 | Canziani ............... B65G 43/08 198/357 |
| 5,051,225 | A | * | 9/1991 | Hommes ............... B29C 55/165 264/288.4 |
| RE39,747 | E | * | 7/2007 | Peltier .................. G01D 5/2451 310/12.11 |
| 2016/0176659 | A1 | | 6/2016 | Aumann et al. |
| 2016/0297626 | A1 | * | 10/2016 | Jochim ................. G05B 19/042 |
| 2020/0030995 | A1 | * | 1/2020 | Lu ........................... H02K 7/14 |

OTHER PUBLICATIONS

English Abstract for JP6155406, Publication Date: Jun. 28, 2017.
English Abstract for JP2006264737, Publication Date: Oct. 5, 2006.
English Abstract for JP2018172141, Publication Date: Nov. 8, 2018.

* cited by examiner (a)

(b)

LINEAR CONVEYOR

TECHNICAL FIELD

The present invention relates to a linear conveyor in which movers travel on a predetermined traveling track served by a stator by a linear motor to convey an article.

BACKGROUND OF THE INVENTION

In recent years, as a device for conveying an article, a linear conveyor in which movers travel on a predetermined traveling track served by a stator by a linear motor to convey an article is known. Specifically, the linear conveyor is equipped with a stator configuring a linear motor in which a plurality of electromagnets (coil units) is connected, a plurality of movers configuring the linear motor, the mover being composed of a permanent magnet, a holding member attached to the mover to hold an article, and a controller for controlling the traveling of the movers on the stator. In the linear conveyor, the movers travel on a predetermined traveling track served by the stator to convey the article held by the holding members (for example, see Patent Documents 1 and 2).

For example, in the case of conveying an article such as a bag-like member, the holding members of the adjacently arranged movers hold both end portions of the article, and then the movers travel on a traveling track served by the stator. Thus, the article held by the holding members of the movers is conveyed along a conveyance track, and various processing is performed on the article during the conveyance.

Also in this linear conveyor, similar to other conveyors of a belt-type, etc., to attain the improvement of the conveyance efficiency of an article and/or the space-saving, it is assumed to configure so that the article conveyance track is formed not only in a linear track but also in a curved track curved in a predetermined direction or in a closed-loop track, so the stator traveling track for the mover will also have not only a linear traveling track but also a curved traveling track.

PRIOR ART DOCUMENT

Patent Document

Patent Document 1: Japanese Unexamined Patent Application Publication No. 2010-132405
Patent Document 2: Japanese Translation of PCT International Application Publication No. JP-T-2015-525176

SUMMARY OF THE INVENTION

Problems to be Solved by the Invention

However, in cases where the movers travel from the linear traveling track served by the stator to the curved traveling track thereof, even if the interval of the adjacently arranged movers is set to be the same as the interval when traveling on the linear traveling track, the interval of the holding members attached to the adjacently arranged movers changes.

For example, in cases where the holding member is provided at a position which is radially outwardly apart from the traveling track of the mover by a predetermined distance, as shown in FIG. 9, when the adjacently arranged movers travel on the linear traveling track A1, the holding members of the adjacently arranged movers are maintained in a state in which they are parallel to each other on the conveyance track B. However, when the adjacently arranged movers travel on the curved traveling track A2, the holding members of the adjacently arranged movers spread on both sides with each other on the conveyance track B. For this reason, the interval of the holding members of the adjacently arranged movers changes, which may cause a risk that the article held by the holding members is deformed or damaged.

Furthermore, when the movers travel from the curved traveling track A2 served by the stator to the linear traveling track A3 thereof, even if the interval of the adjacently arranged movers is set to be the same as the interval when the adjacently arranged movers travel on the curved traveling track A2, the interval of the holding members attached to the adjacently arranged movers changes.

Such problems also arise when the holding member is provided at a position which is radially inwardly apart from the mover with respect to the traveling track A by a predetermined distance. Note that in FIG. 9, the interval of the adjacently arranged movers on the traveling track A of the movers is referred to as W1, the interval of the adjacent holding members on the conveyance track B of the article is referred to as W2, and the width of the article is referred to as W.

The present invention has been made in view of the above-mentioned problems and aims to provide a linear conveyor capable of safely conveying an article in a linear conveyor having a linear traveling track and a curved traveling track.

Means for Solving the Problems

To achieve the above-described objects, a linear conveyor according to the present invention includes:
  a stator configuring a linear motor;
  a plurality of movers configuring the linear motor, the plurality of movers being mounted on the stator;
  a plurality of holding members each provided to the mover, the plurality of holding members each being configured to hold an article; and
  a controller configured to control traveling of the plurality of movers on the stator, wherein the plurality of movers is configured to travel on a predetermined traveling track served by the stator to convey the article held by the holding members, wherein the stator serves a linear traveling track and a curved traveling track continuously connected to the linear traveling track on a traveling track along which the plurality of movers travel, wherein the holding member is provided at a position which is radially outwardly or radially inwardly apart from the traveling track of the mover served the stator by a predetermined distance, and wherein the controller is configured to control so that when the movers which are arranged adjacently travel on the curved traveling track served by the stator, an interval of the adjacently arranged movers becomes different from an interval of the adjacently arranged movers when the adjacently arranged movers travel on an immediately preceding linear traveling track to adjust an interval of the holding members of the adjacently arranged movers.

Further, it may be configured so that the holding member is provided at a position which is radially outwardly apart from the traveling track of the mover served by the stator by a predetermined distance, and wherein the controller controls so that an interval of the adjacently arranged movers when the adjacently arranged movers travel on the curved traveling track served by the stator becomes narrower than the interval of the adjacently arranged movers when the adjacently arranged movers travel on the immediately preceding linear traveling track to make the interval of the holding members of the adjacently arranged movers constant.

Further, it may be configured so that the holding member is provided at a position which is radially inwardly apart from the traveling track of the mover served by the stator by a predetermined distance, and the controller controls so that when the adjacently arranged movers travel on the curved traveling track served by the stator, the interval of the adjacently arranged movers becomes wider than the interval of the adjacently arranged movers when the adjacently arranged movers travel on the immediately preceding linear traveling track to make the interval of the holding members of the adjacently arranged movers constant.

Further, a linear conveyor according to the present invention includes:

a stator configuring a linear motor;

a plurality of movers configuring the linear motor, the plurality of movers being mounted on the stator;

a plurality of holding members each provided to the mover, the plurality of holding members each being configured to hold an article; and a controller configured to control traveling of the plurality of movers on the stator, wherein the plurality of movers is configured to travel on a predetermined traveling track served by the stator to convey the article held by the holding members, wherein the stator serves a linear traveling track and a curved traveling track continuously connected to the linear traveling track on a traveling track along which the plurality of movers travel, wherein the holding member is arranged at a position which is radially outwardly or radially inwardly apart from the traveling track of the mover served by the stator by a predetermined distance, and wherein the controller is configured to control so that when the movers which are arranged adjacently travel on the curved traveling track served by the stator, an interval of adjacently arranged movers becomes different from an interval of the adjacently arranged movers when the adjacently arranged movers travel on an immediately preceding linear traveling track to adjust a tensile force applied to the article held by the holding members of the adjacently arranged movers.

With this, when the adjacent movers travel from the linear traveling track to the curved traveling track, it is possible to appropriately adjust the tensile force applied to the article held by the holding members of the adjacent movers.

It may be configured so that the holding member is provided at a position which is radially outwardly apart from the traveling track of the mover served by the stator by a predetermined distance, and the controller controls so that an interval of the adjacently arranged movers when the adjacently arranged movers travel on the curved traveling track served by the stator becomes narrower than the interval of the adjacently arranged movers when the adjacently arranged movers travel on the immediately preceding linear traveling track to make the tensile force applied to the article held by the holding members of the adjacently arranged movers constant.

Further, it may be configured so that the holding member is provided at a position which is radially inwardly apart from the traveling track of the mover served by the stator by a predetermined distance and the controller controls so that when the adjacently arranged movers travel on the curved traveling track served by the stator, the interval of the adjacently arranged movers becomes wider than the interval of the adjacently arranged movers when the adjacently arranged movers travel on the immediately preceding linear traveling track to make the tensile force applied to the article held by the holding members of the adjacently arranged movers constant.

Also, the controller may control the interval of the adjacently arranged movers by changing a velocity of the mover preceding in a conveying direction and/or the mover succeeding in the conveying direction when the mover preceding in the conveying direction enters the curved traveling track. This makes it possible to accurately adjust the interval of the holding members of the adjacently arranged movers and the tensile force applied to the article held by the holding members of the adjacently arranged movers when the adjacently arranged movers travel on the curved traveling track.

Further, a linear conveyor according to the present invention includes:

a stator configuring a linear motor;

a plurality of movers configuring the linear motor, the plurality of movers being mounted on the stator;

a plurality of holding members each provided to the mover, the plurality of holding members each being configured to hold an article; and a controller configured to control traveling of the plurality of movers on the stator, wherein the plurality of movers is configured to travel on a predetermined traveling track served by the stator to convey the article held by the holding members, wherein the stator serves a curved traveling track and a linear traveling track continuously connected to the curved traveling track on a traveling track along which the plurality of movers travels, wherein the holding member is provided at a position which is radially outwardly or radially inwardly apart from the traveling track of the mover served the stator by a predetermined distance, and wherein the controller is configured to control so that when the movers which are arranged adjacently travel on the linear traveling track served by the stator, an interval of the adjacently arranged movers becomes different from an interval of the adjacently arranged movers when the adjacently arranged movers travel on an immediately preceding curved traveling track to adjust an interval of the holding members of the adjacently arranged movers.

This makes it possible to appropriately adjust the interval of the holding members of the adjacently arranged movers when the adjacently arranged movers travel from the curved traveling track to the linear traveling track.

Further, it may be configured so that the holding member is provided at a position which is radially outwardly apart from the traveling track of the mover served by the stator by a predetermined distance, and the controller controls so that when the adjacently arranged movers travel on the linear traveling track served by the stator, the interval of the adjacently arranged movers becomes wider than the interval of the adjacently arranged movers when the adjacently arranged movers travel on the immediately preceding curved traveling track to make the interval of the holding members of the adjacently arranged movers constant.

Further, it may be configured so that the holding member is provided at a position which is radially inwardly apart from the traveling track of the mover served by the stator by a predetermined distance, and the controller controls so that when the adjacently arranged movers travel on the linear traveling track served by the stator, the interval of the adjacently arranged movers becomes narrower than the interval of the adjacently arranged movers when the adjacently arranged movers travel on the immediately preceding curved traveling track to make the interval of the holding members of the adjacently arranged movers constant.

Further, a linear conveyor according to the present invention includes:

a stator configuring a linear motor;

a plurality of movers configuring the linear motor, the plurality of movers being mounted on the stator;

a plurality of holding members each provided to the mover, the plurality of holding members each being configured to hold an article; and a controller configured to control traveling of the plurality of movers on the stator, wherein the plurality of movers is configured to travel on a predetermined traveling track served by the stator to convey the article held by the holding members, wherein the stator serves a curved traveling track and a linear traveling track continuously connected to the curved traveling track on a traveling track along which the plurality of movers travel, wherein the holding member is arranged at a position which is radially outwardly or radially inwardly apart from the traveling track of the mover served by the stator by a predetermined distance, and wherein the controller is configured to control so that when the movers which are arranged adjacently travel on the linear traveling track served by the stator, an interval of adjacently arranged movers becomes different from an interval of the adjacently arranged movers when the adjacently arranged movers travel on an immediately preceding curved traveling track to adjust a tensile force applied to the article held by the holding members of the adjacently arranged movers.

This makes it possible to accurately adjust the interval of the holding members of the adjacently arranged movers and the tensile force applied to the article held by the holding members of the adjacently arranged movers when the adjacently arranged movers travel on the linear traveling track from the curved traveling track.

Further, it may be configured so that the holding member is provided at a position which is radially outwardly apart from the traveling track of the mover served by the stator by a predetermined distance and the controller controls so that an interval of the adjacently arranged movers when the adjacently arranged movers travel on the linear traveling track served by the stator becomes wider than the interval of the adjacently arranged movers when the adjacently arranged movers travel on the immediately preceding curved traveling track to make the tensile force applied to the article held by the holding members of the adjacently arranged movers constant.

Further, it may be configured so that the holding member is provided at a position which is radially inwardly apart from the traveling track of the mover served by the stator by a predetermined distance, and the controller controls so that when the adjacently arranged movers travel on the linear traveling track served by the stator, the interval of the adjacently arranged movers becomes narrower than the interval of the adjacently arranged movers when the adjacently arranged movers travel on the immediately preceding curved traveling track to make the tensile force applied to the article held by the holding members of the adjacently arranged movers constant.

Furthermore, it may be configured so that the controller controls the interval of the adjacently arranged movers by changing a velocity of the mover preceding in a conveying direction and/or the mover succeeding in the conveying direction when the mover preceding in the conveying direction enters the linear traveling track.

With this, it is possible to accurately adjust the interval of the holding members of the adjacently arranged movers or the tensile force applied to the article held by the holding members of the adjacently arranged movers when the adjacently arranged movers travel on the linear traveling track.

Further, it may be configured so that the controller controls the interval of the adjacently arranged movers based on information relating to positions of a plurality of points on the traveling track of the movers served by the stator and information relating to positions of the holding members corresponding to the position of each of the points.

With this, it is possible to quickly and reliably adjust the interval of the holding members of the adjacently arranged movers and the tensile force applied to the article held by the holding members of the adjacently arranged movers.

Further, it may be configured so that the controller controls the interval of the adjacently arranged movers based on information relating to positions of a plurality of first points on the traveling track of the movers served by the stator, information relating to a position of a second point apart from each first point radially outward or radially inward with respect to the traveling track of the movers by a predetermined distance, and information relating to a distance from the position of the first point or the second point to the position of the holding member.

With this, even in cases where the positions of the holding members differ depending on the article, it is possible to quickly and reliably adjust the interval of the holding members of the adjacently arranged movers or the tensile force applied to the article held by the holding members of the adjacently arranged movers.

It may be configured so that the controller adjusts the interval of the holding members by controlling the interval of the adjacently arranged movers based on a magnitude of a force received by the holding member from the article.

With this, the interval of the holding members of the adjacently arranged movers can be adjusted based on the force received by the holding member from the article.

Effects of the Invention

According to the present invention, when the adjacently arranged movers travel from the linear traveling track to the curved traveling track, or when the adjacently arranged movers travel from the curved traveling track to the linear traveling track, the interval of the holding members of the adjacently arranged movers can be appropriately adjusted. Therefore, when the interval of the holding members is kept constant or the tensile force applied to the article is kept constant, the article can be safely conveyed without causing deformation or breakage of the article. Further, when the interval of the holding member is narrowed or the tensile force applied to the article is reduced, the end portion of the article can be opened by loosening the article. Furthermore, when the interval of the holding members is widened or the tensile force applied to the article is increased, foreign substances can be prevented from being entering into the article by pulling the article in the width directions. As described above, since articles can be safely conveyed by the linear conveyor having curved and linear traveling tracks, it becomes possible to further improve the efficiency and the space-saving of the linear conveyor.

EMBODIMENTS FOR CARRYING OUT THE INVENTION

Next, some embodiments of a linear conveyor (hereinafter referred to as "this apparatus") according to the present invention will be described with reference to FIG. 1 to FIG. 6.

Figure 2:
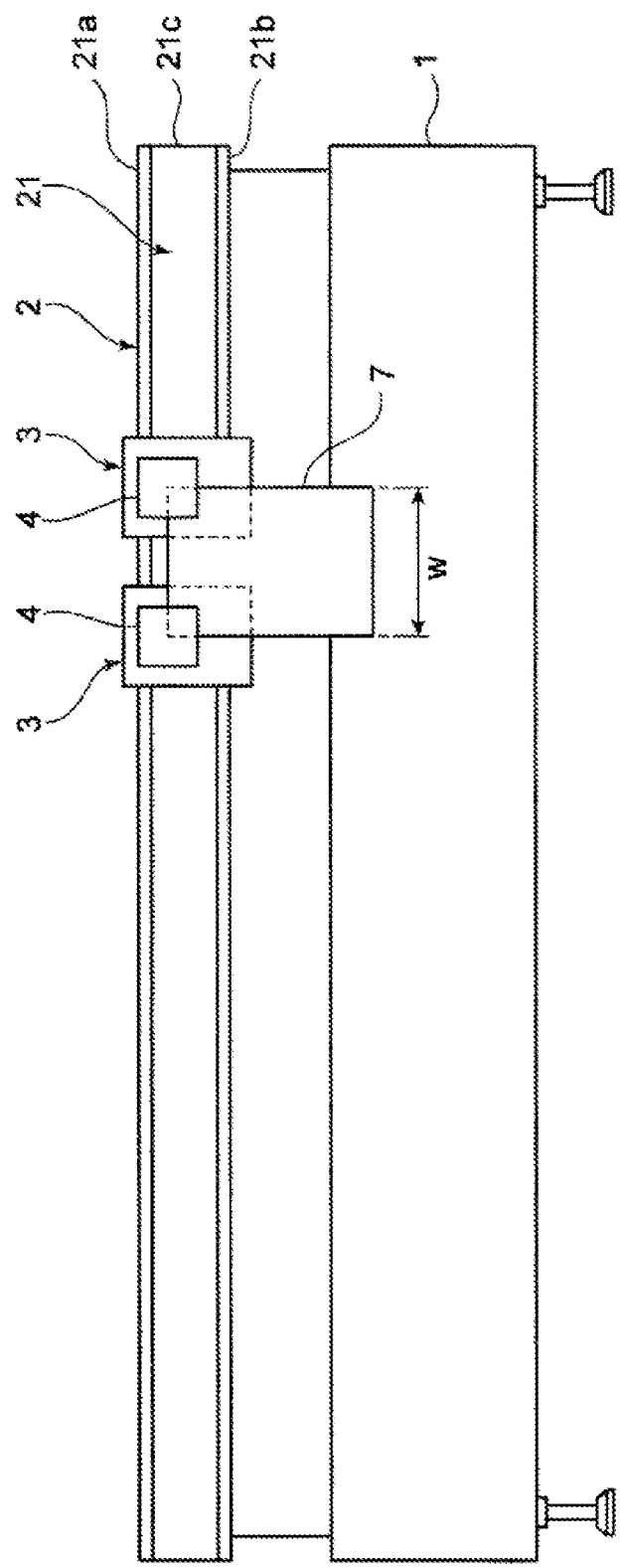
FIG. 2 is a side view of the linear conveyor of FIG. 1.

Note that in this embodiment, the term "right" refers to "right" in FIG. 2, "left" refers to "left" in FIG. 2, "upper" refers to "upper" in FIG. 2, "lower" refers to "lower" in FIG. 2, "front" refers to "front" in FIG. 2, and "back" refers to "back" in FIG. 2. Further note that the following description will be made, assuming that an article 7 is a flexible bag-like member (e.g., a pouch) having a rectangular shape in a side view with a width W and having an opened upper portion.

As shown in FIG. 1 to FIG. 4, this apparatus is provided with a base platform 1, a stator 2 configuring a linear motor provided on an upper portion of the base platform 1, a plurality of movers 3 configuring the linear motor provided on the stator 2, and a controller 6 for controlling the traveling of the movers 3 on the stator 2. Note that there actually exists a plurality of sets each consisting of two movers 3, but for the convenience of explanation, the following description will be made, assuming that only one set exists.

The stator 2 made of metal or the like is formed in an oval shape in plan view, and is provided with a guide rail 21 on the side surface thereof. This guide rail 21 is composed of a metal upper guide member 21a provided on the upper peripheral edge portion of the stator 2, a metal lower guide member 21b provided on the lower peripheral edge portion of the stator 2, and a center guide member 21c having a high magnetic property provided between the upper guide member 21a and the lower guide member 21b, and is formed in an oval shape corresponding to the shape of the stator 2.

Figure 4:
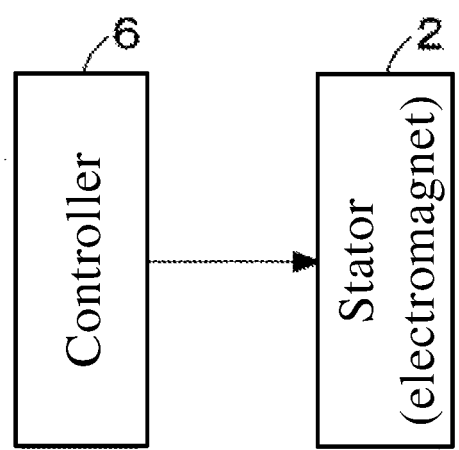
FIG. 4 is a block diagram showing an electric configuration of a stator.

In the stator 2, a plurality of electromagnets 22 (coil units) are arranged along the circumference direction inside the guide rail 21. In these electromagnets 22, as shown in FIG. 4, the polarities are changed by changing the current supplied from a power source (not shown) by the controller 6.

Figure 1:
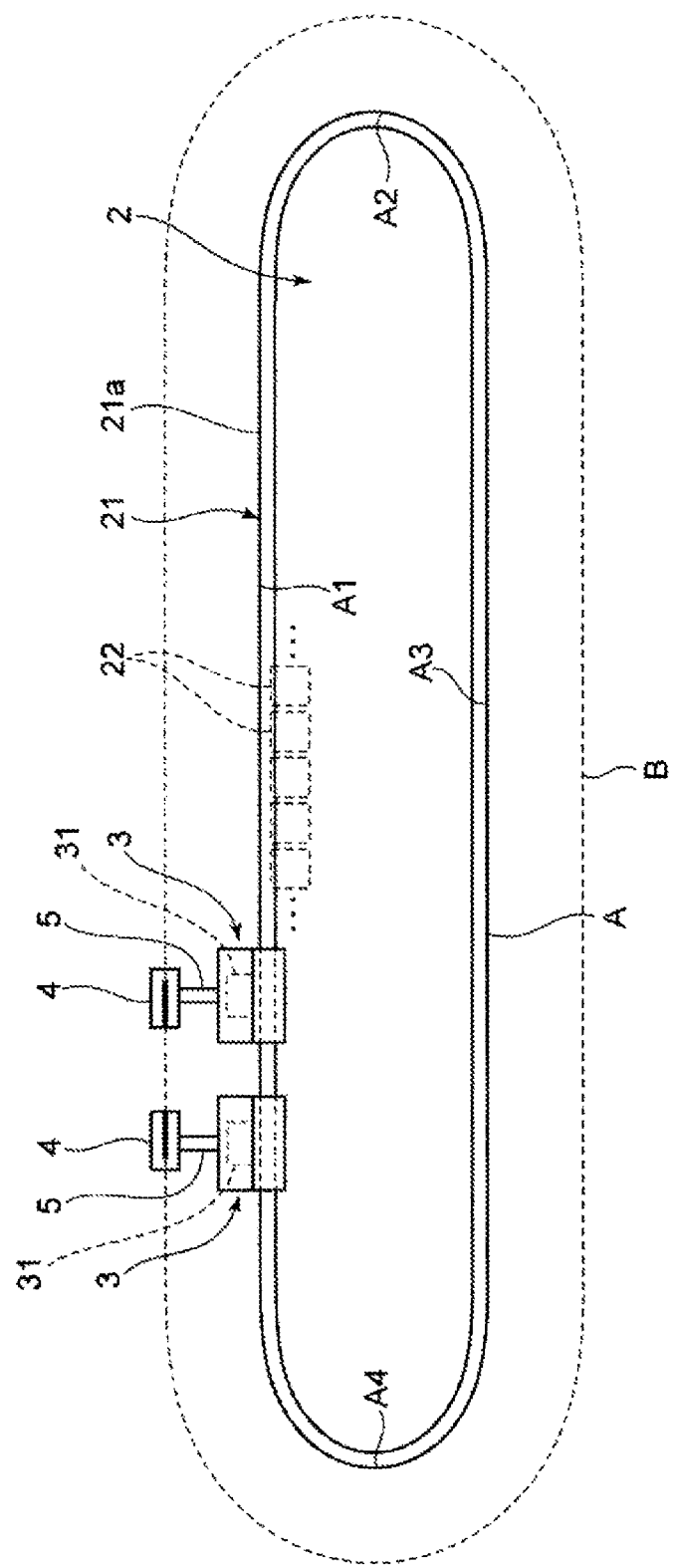
FIG. 1 is a plan view of a linear conveyor according to an embodiment of the present invention.

As shown in FIG. 1, in the stator 2, a track along the guide rail 21 is served as a traveling track A of the movers 3. The traveling track A includes a linear traveling track (hereinafter referred to as a "linear traveling track A1") on the backside of the guide rail 21, a curved traveling track (hereinafter referred to as a "curved traveling track A2") on the right side, a linear traveling track (hereinafter referred to as a "linear traveling track A3") on the front side, and a curved traveling track (hereinafter referred to as a "curved traveling track A4") on the left side.

The mover 3 made of metal is formed in a rectangular shape and is provided so as to be able to travel on the peripheral surface of the guide rail 21 of the stator 2. Specifically, the mover 3 is provided on the side surface of the stator 2 in such a manner that the upper portion is engaged with the upper guide member 21a of the stator 2, the lower portion is engaged with the lower guide member 21b of the stator 2, and the inner surface is opposed to the peripheral surface of the center guide member 21c of the guide rail 21 with a predetermined space therebetween.

The mover 3 is provided with a permanent magnet 31 therein, and the permanent magnet 31 receives an attractive force or a repulsive force in accordance with a polarity change of the electromagnet 22 of the stator 2. Therefore, when the polarity of the respective electromagnets 22 of the stator 2 is repeatedly changed along the predetermined direction by the controller 6, the permanent magnet 31 of the mover 3 is pulled sequentially to the polarities of the electromagnets 22 of the stator 2 in accordance with the polarity changes, so that the mover 3 receives the propulsion force in the predetermined direction. As a result, the mover 3 travels in the conveying direction or the opposite direction thereof along the traveling track served by the stator 2. At this time, the traveling velocity of the mover 3 can be changed by changing the time interval of the polarity change of each electromagnet 22 of the stator 2 using the controller 6.

The mover 3 is provided with a holding member 4 for holding an article 7. The holding member 4 is arranged at a position which is radially outwardly apart from the outside of the mover 3 with respect to the traveling track of the mover 3 by a predetermined distance L via a supporting member 5 provided on the outside of the mover 3. Therefore, when the mover 3 travels along the traveling track A served by the stator 2, the article 7 held by the holding member 4 is conveyed along a conveyance track B which is radially outwardly apart from the traveling track of the mover 3 by a predetermined distance L.

Further, the holding members 4 of the pair of adjacently arranged movers 3 are configured to hold the article 7. The holding member 4 positioned preceding in the conveying direction of the article 7 (the right direction in FIG. 2 in this embodiment) grips the front upper end portion of the article 7, and the holding member 4 positioned succeeding in the traveling direction of the mover 3 grips the rear upper end portion of article 7. For this reason, as the interval W1 of the adjacently arranged movers 3 becomes narrower, the interval W2 of the holding members 4 becomes narrower, so that the article 7 is compressed in the circumferential direction. On the other hand, as the interval W1 of the adjacently arranged movers 3 becomes wider, the interval W2 of the holding members 4 also becomes wider, so that the article 7 is pulled in the circumferential direction.

The supporting member 5 is provided in such a manner as to extend at a right angle radially outward (outward in the normal direction) with respect to the traveling track of the movers 3. Therefore, since the supporting members 5 of the adjacently arranged movers 3 are in a state parallel to each other when traveling on the linear traveling tracks A1 and A3, the holding members 4 of the adjacently arranged movers 3 are also in a state parallel to each other. On the other hand, since the adjacent supporting members 5 take a posture spread in a fan shape when traveling on the curved traveling tracks A2 and A4, the holding members 4 of the adjacently arranged movers 3 also take a posture spread circumferentially with respect to each other.

Figure 3:
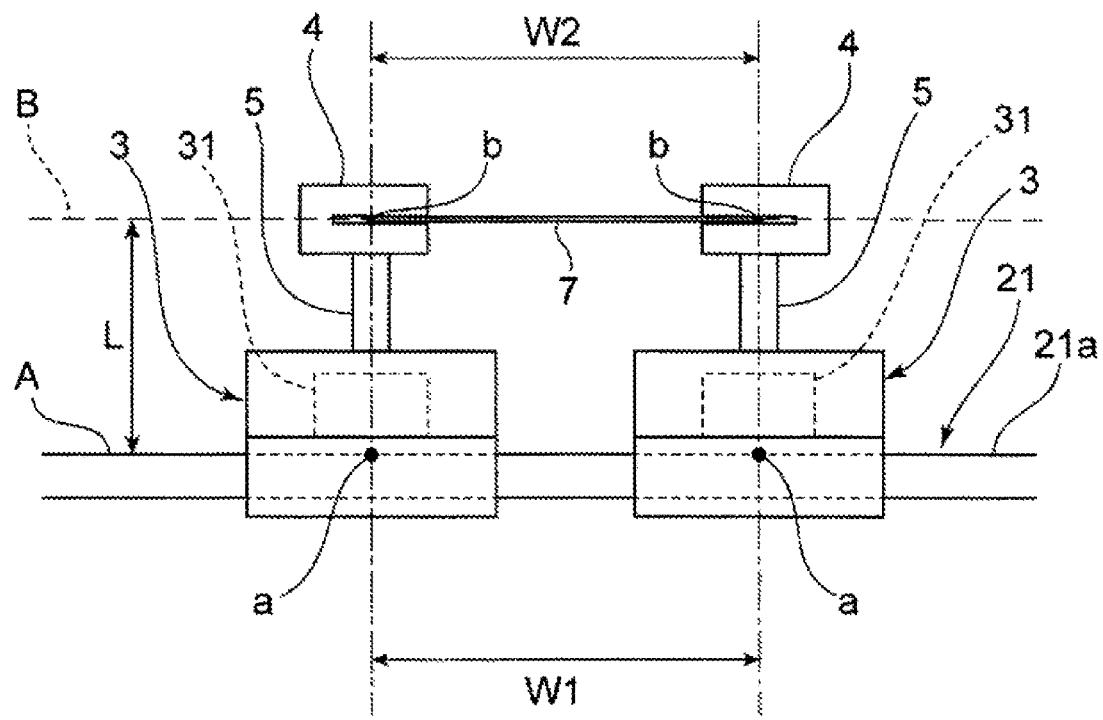
FIG. 3 is an enlarged plan view of movers and holding members.

Note that in this embodiment, as shown in FIG. 3, the interval W1 of the movers 3 refers to an interval of base points each defined by the circumferential central portion "a" of the mover 3 on the circumferential surface of the guide rail 21 of the stator 2. Further note that the interval W2 of the holding members 4 refers to an interval of base points each defined by the circumferential central portion "b" of the portion in which the holding member 4 holds the article 7, as shown in FIG. 1.

Next, the operation (the method of conveying an article 7) of this apparatus will be described. In this embodiment, a series of operations will be described, in which, after the article 7 is filled with contents on the linear traveling track A1, the article 7 is reverted on the curved traveling track A2, and the article 7 is transferred to another process on the linear traveling track A3.

Figure 6:
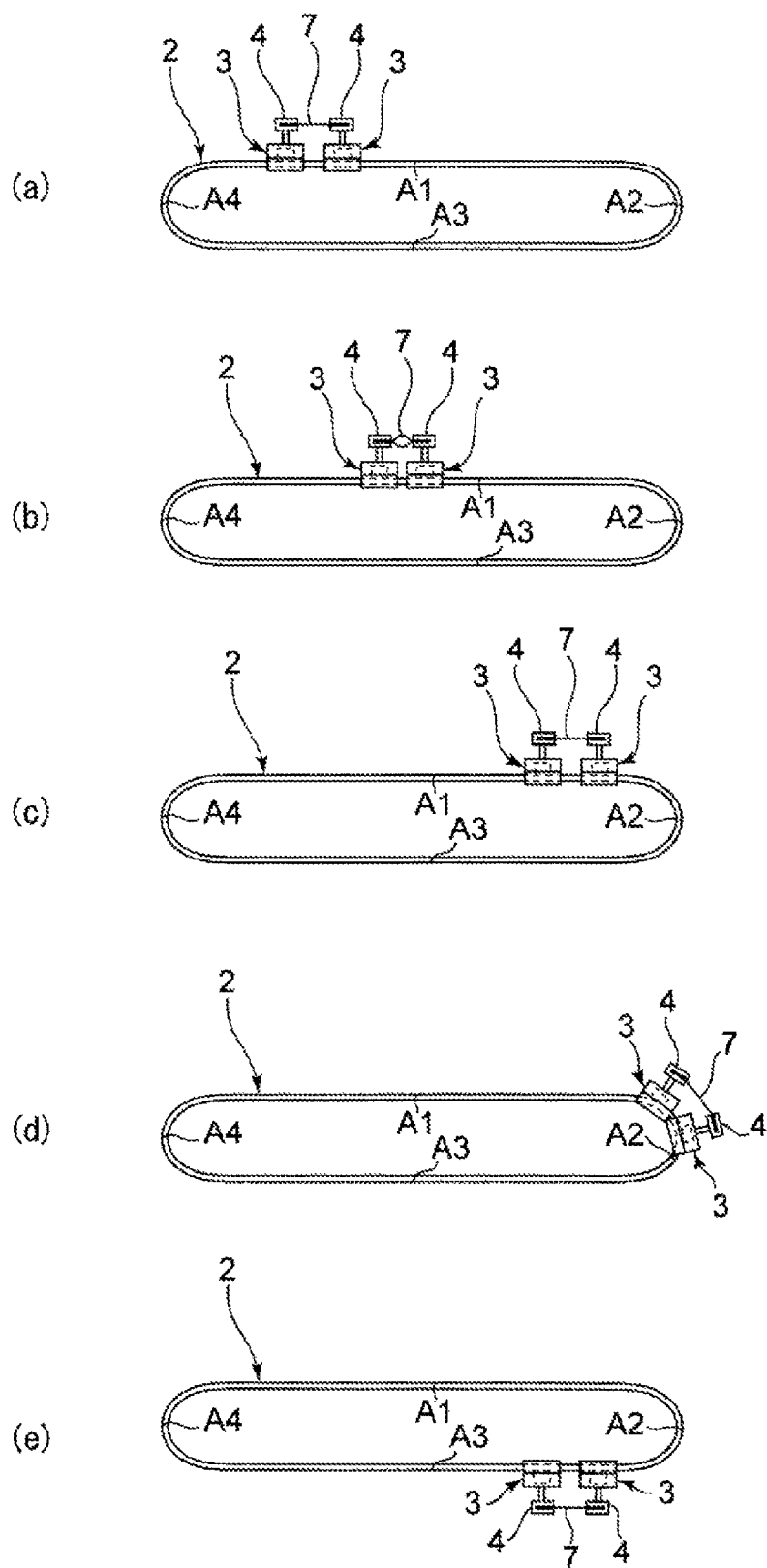
FIG. 6 is a plan view showing the operation process of the linear conveyor of FIG. 1.
Figure 7:
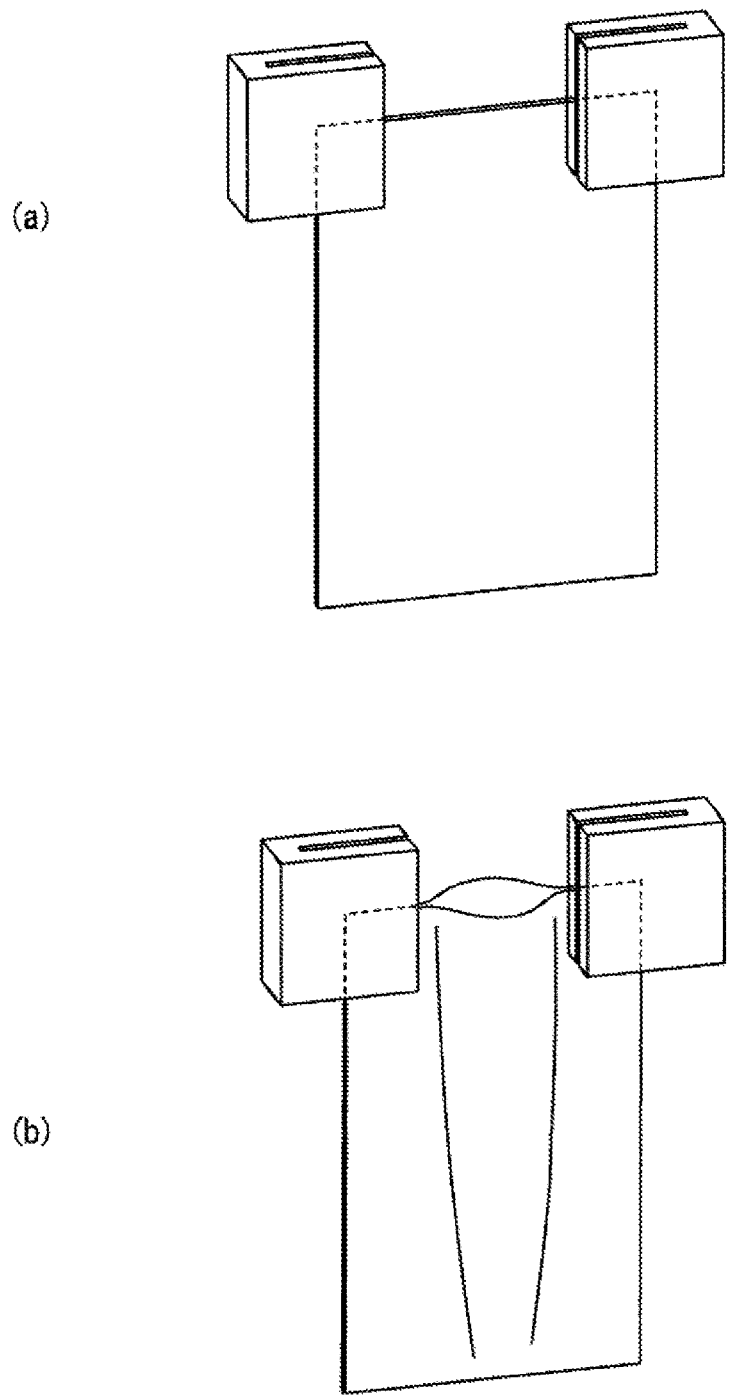
FIG. 7 is a perspective view showing a state in which the holding members are holding an article.

Initially, as shown in (a) of FIG. 6, at the starting position of the movers 3 on the linear traveling track A1 served by the stator 2, the holding members 4 of a pair of adjacently arranged movers 3 hold the front upper end portion and the rear upper end portion of the article 7. At this time, when the interval W1 of the movers 3 is controlled so as to be the same as the width W of the article 7 by the controller 6, the interval W2 of the holding members 4 also becomes the same as the width W of the article 7, similarly to the interval W1 of the movers 3, and the article 7 is held in a natural condition as shown in (a) of FIG. 7.

Next, as shown in (b) of FIG. 6, when the polarities of the electromagnets 22 of the stator 2 are repeatedly changed in the forward direction by the controller 6 in the front half portion of the linear traveling track A1 served by the stator 2, the pair of adjacently arranged movers 3 travels in the conveying direction on the linear traveling track A1 served by the stator 2. At this time, when the interval W1 of the movers 3 is controlled so as to be narrower than the width W of the article 7 by the controller 6, the interval W2 of the holding members 4 also becomes narrower in accordance with the interval W1 of the movers 3, so that the article 7 is bent while being compressed circumferentially during the conveyance, which causes the upper portion of the article 7 to be opened as shown in (b) of FIG. 7. Then, when the movers 3 has reached the central position of the linear traveling track A1 served by the stator 2, the contents are filled from the opened top of the article 7 to the inside.

Next, as shown in (c) of FIG. 6, when the polarities of the electromagnets 22 are repeatedly changed in the forward direction by the controller 6 in the second half portion of the linear traveling track A1 served by the stator 2, the pair of adjacently arranged movers 3 travels in the conveying direction on the linear traveling track A1 served by the stator 2. At this time, if the interval W1 of the movers 3 is controlled so as to become wider by the controller 6 until it becomes the same as the width W of the article 7, the interval of the holding members 4 also becomes wider according to the interval W1 of the movers 3. Therefore, the bending of the article 7 is solved by being pulled circumferentially during the conveyance, so that the opening of the article 7 is closed. Until the movers 3 has reached the end position of the linear traveling track A1 served by the stator 2, the interval W2 of the holding members 4 becomes the same as the width W of the article 7, so that the article 7 is held in a natural condition as shown in (a) of FIG. 7.

Figure 5:
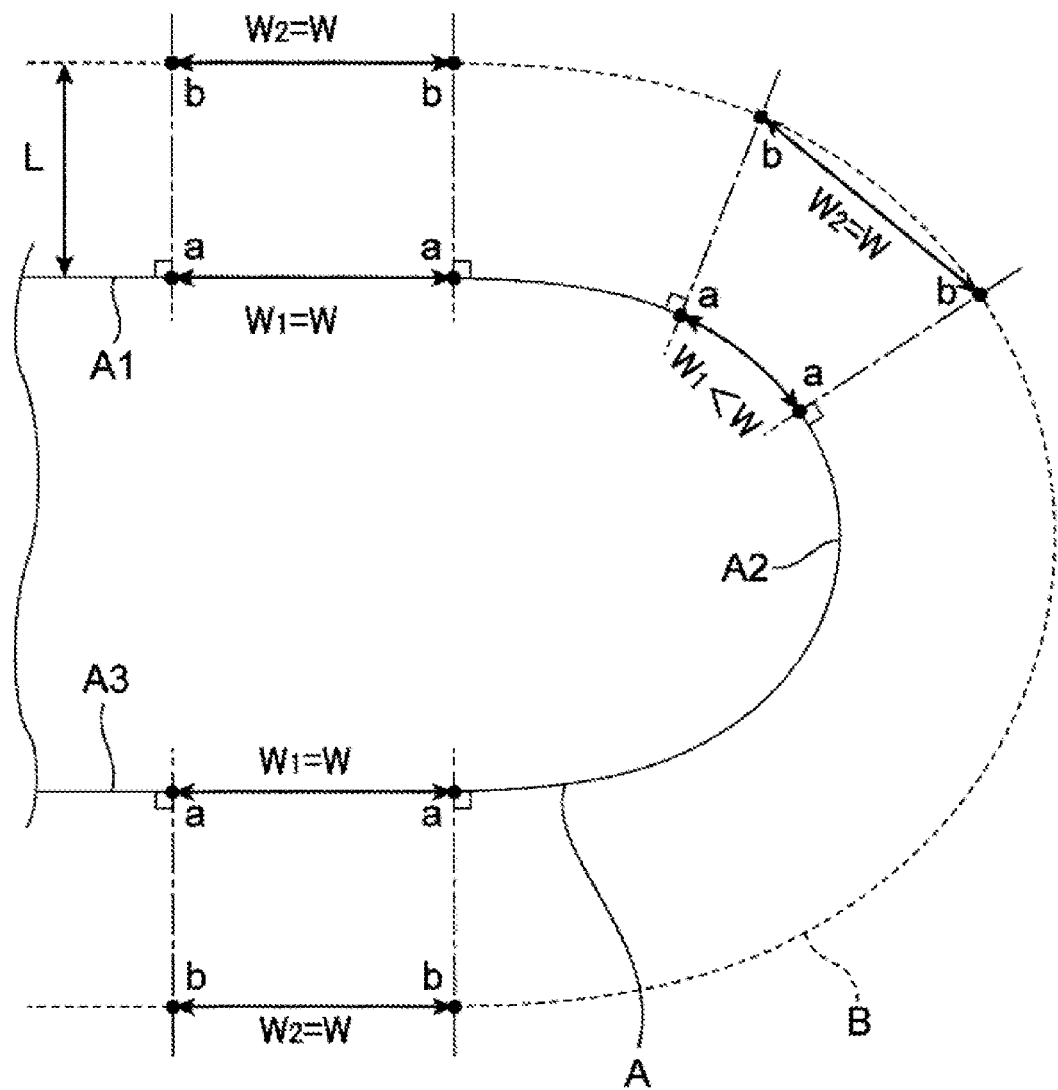
FIG. 5 is a schematic diagram showing the states of the interval between movers and holding members on a traveling track.
Figure 9:
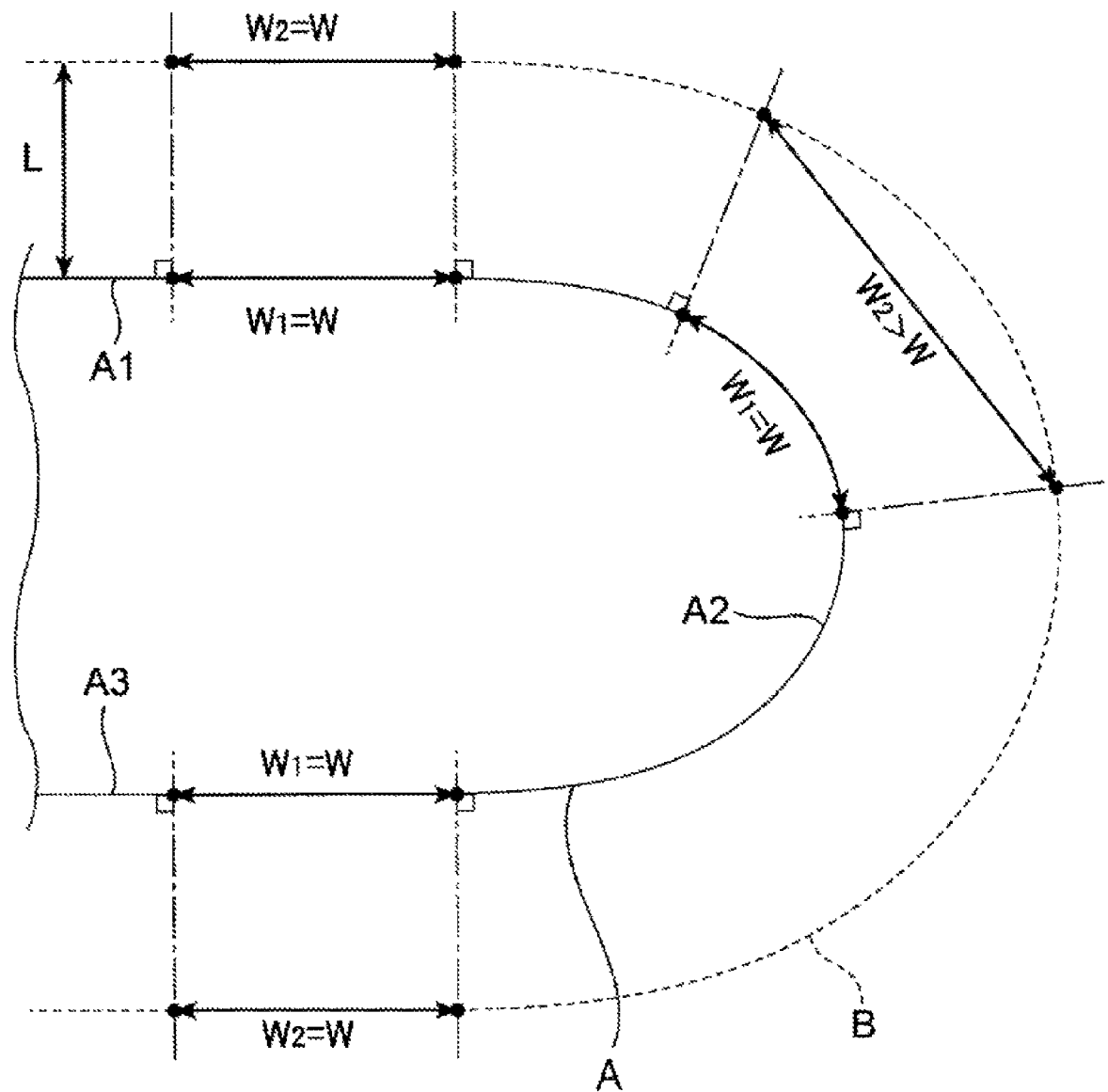
FIG. 9 is a schematic diagram showing the state of the interval of movers and that of holding members on the traveling track of a conventional linear conveyor.

Next, as shown in (d) of FIG. 6, when the polarities of the electromagnets 22 are repeatedly changed in the forward direction by the controller 6 on the curved traveling track A2 served by the stator 2, the pair of adjacently arranged movers 3 travels in the conveying direction along the curved traveling track A2 served by the stator 2. At this time, if the interval W1 of the movers 3 is kept the same as the interval (the same as the width W of the article 7) at the ending position of the linear traveling track A1, as shown in FIG. 9, the interval W2 of the holding members 4 spreads in the circumferential direction from the width W of the article 7. As a result, both sides of the article 7 will be pulled by the holding members 4 in the circumferential direction, which may cause the article 7 to be deformed or broken. For this reason, in the present invention, as shown in FIG. 5, by controlling the interval W1 of the movers 3 so as to be narrower than the width W of the article 7 by the controller 6, the interval W2 of the holding members 4 becomes the same as the width W of the article 7, and as shown in (a) of FIG. 7, the article 7 is held in a natural condition.

Note that the control of the interval W1 of the movers 3 by the controller 6 includes, for example, decelerating only the frontward mover 3, or accelerating only the rearward mover 3 in the conveying direction when the frontward mover 3 in the conveying direction enters the curved traveling track A2, or decelerating or accelerating both the movers 3.

Next, as shown in (e) of FIG. 6, when the movers 3 enters the linear traveling track A3 served by the stator 2, by repeatedly changing the polarities of the electromagnets 22 of the stator 2 in the forward direction by the controller 6, the pair of adjacent mover 3 travels in the conveying direction along the linear traveling track A3 served by the stator 2. At this time, if the interval W1 of the movers 3 is kept at the interval on the curved traveling track A2, the interval W2 of the holding members 4 becomes narrower than the width W of the article 7, which may cause a risk that both sides of the article 7 held by the holding members 4 are circumferentially compressed to open the opening portion. Therefore, by controlling the interval W1 of the movers 3 so as to become wider again by the controller 6 to become the same as the width W of the article 7, the interval W2 of the holding members 4 becomes the same as the width W of the article 7, so that the article 7 is held in a natural condition as shown in (a) of FIG. 7.

Note that the control of the interval W1 of the movers 3 by the controller 6 includes, for example, acceleration of only the frontward mover 3, deceleration of only the rearward mover 3, and acceleration or deceleration of both the movers 3 when the frontward mover 3 enters the linear traveling track A3.

As described above, when the movers 3 travel on the linear conveyance track A1, the curved conveyance track A2, and the linear conveyance track A3, the interval of the holding members 4 of the adjacently arranged movers 3 is kept constant to the same extent as the width W of the article 7, so that the article 7 can be safely conveyed without causing deformation or breakage of the article 7.

Thereafter, at a predetermined position of the movers 3 on the linear traveling track A3 served by the stator 2, the holding members 4 transfer the article 7 filled with the contents to another process, and then travels on the curved traveling track A4, and returns to the starting position of the linear traveling track A1 as shown in (a) of FIG. 6.

Note that in this embodiment, a closed loop-shaped traveling track A having an oval shape in plan view has been described, but the traveling track A may have another shape.

Further note that a pair of two movers 3 has been described, but a pair of three or more movers may be used.

Further note that the holding member 4 is provided at a position which is radially outwardly apart with respect to the traveling track A of the mover 3 served by the stator 2 by a predetermined distance, but the holding member may be provided at a position which is radially inwardly apart by a predetermined distance.

Further note that when the movers 3 travel on the curved traveling track A2 served by the stator 2, the above-described controller 6 controls the interval of the adjacently arranged movers 3 so as to become narrower than the interval when the adjacently arranged movers travel on the immediately preceding linear traveling track A1 to make the interval of the holding members 4 of the adjacently arranged movers 3 constant, but the interval of the holding members 4 of the adjacently arranged movers 3 may be adjusted by controlling the interval of the adjacently arranged movers 3 so as to become different from the interval when the adjacently arranged movers 3 travel on the immediately preceding linear traveling track A1.

Further note that when the movers 3 travel on the linear traveling track A3 served by the stator 2, the above-described controller 6 controls the interval of the adjacently arranged movers 3 so as to become wider than the interval when the adjacently arranged movers 3 travel on the immediately preceding curved traveling track A2 to make the interval of the holding members 4 of the adjacently arranged movers 3 constant, but the interval of the holding members 4 of the adjacently arranged movers 3 may be adjusted by controlling the interval of the adjacently arranged movers 3 so as to become different from the interval when the adjacently arranged movers 3 travel on the immediately preceding curved traveling track A2.

Further note that when the movers 3 travel on the curved traveling track A2 or the linear traveling track A3 served by the stator 2, the above-described controller 6 controls so that the interval of adjacently arranged movers 3 becomes different from the interval when the adjacently arranged movers 3 travel on the immediately preceding linear traveling track A1 or the curved traveling track A2 so as to adjust the interval of the holding members 4 of the adjacently arranged movers 3, but the controller 6 may control the tensile force applied to the article 7 held by the holding members 4 of the adjacently arranged movers 3 by controlling the interval of the adjacently arranged movers 3 so as to be different from the interval when the movers 3 travel on the immediately preceding linear traveling track A1 or the curved traveling track A2. For example, when the tensile force applied to the article 7 held by the holding members 4 is kept constant, the article 7 can be safely conveyed without causing deformation or breakage of the article 7. When the tensile force applied to the article 7 held by the holding members 4 is reduced, the end portion of the article 7 can be opened by bending the article 7. Further, when the tensile force applied to the article 7 held by the holding member 4 is increased, foreign substances can be prevented from entering the inside of the article 7 by pulling the article 7 in the width directions.

Further, when the curvature of the curved traveling track A2 is constant, the interval W1 of the movers 3 may be controlled once when the movers 3 travels on the curved traveling track A2, but when the curvature of the curved traveling track A2 changes, it is preferable to control the interval W1 of the movers 3 as needed so that the interval W2 of the holding members becomes constant.

In this case, this apparatus may store in advance the information relating to the positions of a plurality of points of the movers 3 on the traveling track served by the stator 2 and the information relating to positions of the holding member 4 corresponding to the positions of the respective points, and control the interval W1 of the movers 3 based on these pieces of information when the movers 3 travel on the curved traveling track so that the interval of the holding members 4 or the tensile force applied to the article 7 held by the holding members 4 become a predetermined value.

Further, when the positions of the holding members 4 differ in the radial direction with respect to the traveling track of the movers 3 depending on the article, the information relating to the position of the first point on the traveling track A of the movers 3 and the information relating to the position of the second point apart from the first point radially inward or radially outward by a predetermined distance are stored in advance, and the controller 6 controls the interval W1 of the movers 3 based on these pieces of information and the distance (offset distance) from the position of the first position or the position of the second point to the position of the holding member 4 so that the interval of the holding members 4 or the tensile force generated in the article 7 held in the holding member 4 becomes a predetermined value.

Figure 8:
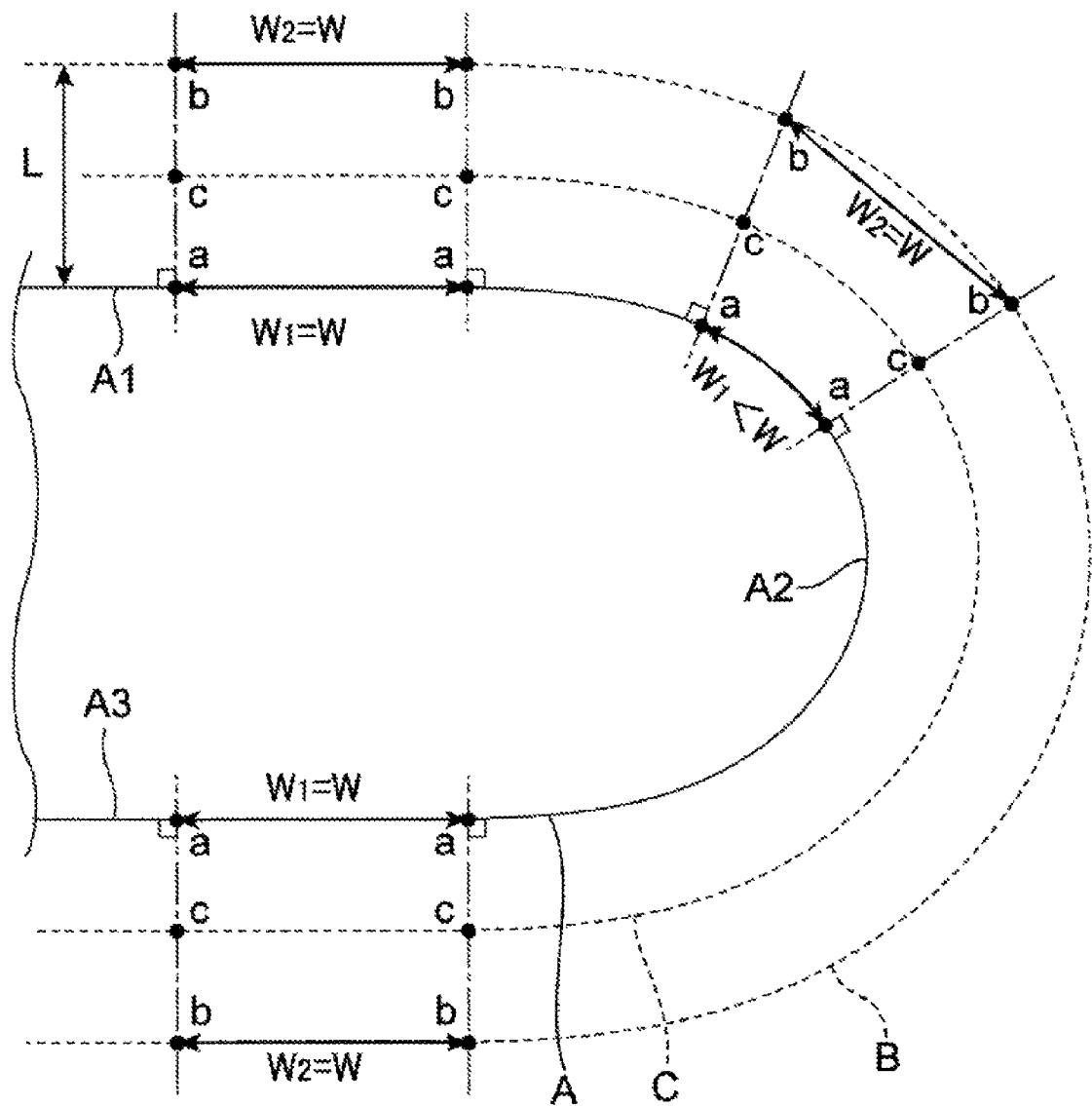
FIG. 8 is a schematic diagram showing the state of the interval of movers and that of holding members on the traveling track of the linear conveyor according to another embodiment.

Specifically, as illustrated in FIG. 8, when the positions "a" of a plurality of first points on the traveling track A of the movers 3 and the positions "c" of a plurality of second points corresponding thereto are stored in advance, by inputting the information relating to the offset distance from the position "a" of the first point or the position "c" of the second point to the holding member 4, it is possible to calculate a position "b" of the holding member 4 that exists on a linear line connecting the position "a" of the first point on the traveling track A of the movers 3 to the corresponding position "c" of the second point. Therefore, the controller 6 can control the interval of the adjacently arranged movers 3 so that, based on the calculated plurality of positions "b" of the holding member 4, the interval of the adjacent holding members 4 or the tensile force applied to the article 7 held by the holding members 4 becomes a predetermined value.

The controller 6 may be configured to adjust the interval of the holding members 4 by controlling the interval of the adjacently arranged movers 3 based on the magnitude of the force received by the holding members 4 from the article 7. That is, when the adjacently arranged movers 3 travel on the curved traveling track A2 or the linear traveling track A3, if the interval of the movers 3 is set to be the same interval as that of the immediately preceding linear traveling track A1 or the curved traveling track A2, the interval of the holding members 4 becomes different as described above, so that the holding members 4 will pull or bend the article 7. At this time, since the force received by the holding members 4 from the article 7 (the tensile force applied to the article 7 in this embodiment) also changes, the force is read by a sensor (not illustrated) or the like, and the interval of the holding members 4 is adjusted by controlling the interval of the adjacently arranged movers 3 based on the magnitude of the force read by the controller 6.

The embodiments of the present invention have been described above with reference to the attached drawings, but the present invention is not limited to the illustrated embodiments. It should be understood that various modifications and variations can be made to the illustrated embodiments falling within the same or equivalent scope as the present invention.

DESCRIPTION OF SYMBOLS

1: Base platform
2: Stator
21: Guide rail
21a: Upper guide member
21b: Lower guide member
21c: Center guide member
22: Electromagnet
3: Mover
31: Permanent magnet
4: Holding member
5: Supporting member
6: Controller
7: Article

The invention claimed is:

1. A linear conveyor comprising:
a stator configuring a linear motor;
a plurality of movers configuring the linear motor, the plurality of movers being mounted on the stator;
a plurality of holding members each provided to the mover, the plurality of holding members each being configured to hold an article; and
a controller configured to control traveling of the plurality of movers on the stator,
wherein the plurality of movers is configured to travel on a predetermined traveling track served by the stator to convey the article held by the holding members,
wherein the stator serves a linear traveling track and a curved traveling track continuously connected to the linear traveling track on a traveling track along which the plurality of movers travel,
wherein the holding member is arranged at a position which is radially outwardly or radially inwardly apart from the traveling track of the mover served by the stator by a predetermined distance, and
wherein the controller is configured to control so that when the movers which are arranged adjacently travel on the curved traveling track served by the stator, an interval of adjacently arranged movers becomes different from an interval of the adjacently arranged movers when the adjacently arranged movers travel on an immediately preceding linear traveling track to adjust a tensile force applied to the article held by the holding members of the adjacently arranged movers.

2. The linear conveyor as recited in claim 1,
wherein the holding member is provided at a position which is radially outwardly apart from the traveling track of the mover served by the stator by a predetermined distance, and
wherein the controller controls so that an interval of the adjacently arranged movers when the adjacently arranged movers travel on the curved traveling track served by the stator becomes narrower than the interval of the adjacently arranged movers when the adjacently arranged movers travel on the immediately preceding linear traveling track to make the tensile force applied to the article held by the holding members of the adjacently arranged movers constant.

3. The linear conveyor as recited in claim 1,
wherein the holding member is provided at a position which is radially inwardly apart from the traveling track of the mover served by the stator by a predetermined distance, and
wherein the controller controls so that when the adjacently arranged movers travel on the curved traveling track served by the stator, the interval of the adjacently arranged movers becomes wider than the interval of the adjacently arranged movers when the adjacently arranged movers travel on the immediately preceding linear traveling track to make the tensile force applied to the article held by the holding members of the adjacently arranged movers constant.

4. A linear conveyor comprising:
a stator configuring a linear motor;
a plurality of movers configuring the linear motor, the plurality of movers being mounted on the stator;
a plurality of holding members each provided to the mover, the plurality of holding members each being configured to hold an article; and
a controller configured to control traveling of the plurality of movers on the stator,
wherein the plurality of movers is configured to travel on a predetermined traveling track served by the stator to convey the article held by the holding members,
wherein the stator serves a curved traveling track and a linear traveling track continuously connected to the curved traveling track on a traveling track along which the plurality of movers travel,
wherein the holding member is arranged at a position which is radially outwardly or radially inwardly apart from the traveling track of the mover served by the stator by a predetermined distance, and
wherein the controller is configured to control so that when the movers which are arranged adjacently travel on the linear traveling track served by the stator, an interval of adjacently arranged movers becomes different from an interval of the adjacently arranged movers when the adjacently arranged movers travel on an immediately preceding curved traveling track to adjust a tensile force applied to the article held by the holding members of the adjacently arranged movers.

5. The linear conveyor as recited in claim 4,
wherein the holding member is provided at a position which is radially outwardly apart from the traveling track of the mover served by a predetermined distance, and
wherein the controller controls so that an interval of the adjacently arranged movers when the adjacently arranged movers travel on the linear traveling track served by the stator becomes wider than the interval of the adjacently arranged movers when the adjacently arranged movers travel on the immediately preceding curved traveling track to make the tensile force applied to the article held by the holding members of the adjacently arranged movers constant.

6. The linear conveyor as recited in claim 4,
wherein the holding member is provided at a position which is radially inwardly apart from the traveling track of the mover served by the stator by a predetermined distance, and
wherein the controller controls so that when the adjacently arranged movers travel on the linear traveling track served by the stator, the interval of the adjacently arranged movers becomes narrower than the interval of the adjacently arranged movers when the adjacently arranged movers travel on the immediately preceding curved traveling track to make the tensile force applied to the article held by the holding members of the adjacently arranged movers constant.

* * * * *